United States Patent
Kaiser et al.

[11] Patent Number: 5,902,078
[45] Date of Patent: May 11, 1999

[54] BORING HEAD WITH IMBALANCE COMPENSATION

[75] Inventors: Heinz Kaiser, Wallisellen; Hans Woerz, Oberhasli; Dieter Pape, Rümlang, all of Switzerland

[73] Assignee: Heinz Kaiser AG, Rumland, Switzerland

[21] Appl. No.: 08/850,330

[22] Filed: May 2, 1997

[51] Int. Cl.⁶ .................................................. B23B 47/00
[52] U.S. Cl. ........................................ 408/143; 409/141
[58] Field of Search ................................ 408/143, 147; 74/573 R; 409/141; 82/903

[56] References Cited

U.S. PATENT DOCUMENTS

| | | | |
|---|---|---|---|
| 3,097,537 | 7/1963 | Peterson | 408/143 |
| 3,128,582 | 4/1964 | Winther | 408/143 |
| 3,733,923 | 5/1973 | Goodrinch et al. | 74/573 |
| 3,918,326 | 11/1975 | Kida et al. | 74/573 |
| 4,117,742 | 10/1978 | Stein | 74/573 R |
| 4,474,076 | 10/1984 | Lehmann | 74/573 R |
| 4,626,144 | 12/1986 | Berner | 408/143 |
| 5,074,723 | 12/1991 | Massa et al. | |
| 5,263,995 | 11/1993 | Mogilnicki et al. | |
| 5,478,177 | 12/1995 | Romi | 408/143 |

FOREIGN PATENT DOCUMENTS

| | | |
|---|---|---|
| 0 409 050 A2 | 1/1991 | European Pat. Off. . |
| 35 10 259 C2 | of 0000 | Germany . |

*Primary Examiner*—Frances Han
*Assistant Examiner*—Adesh Bhargava
*Attorney, Agent, or Firm*—Weiser and Associates, P.C.

[57] ABSTRACT

In the tool body (2), a tool support (4) for a cutting-plate holder (6) is mounted capable of fine radial movements. To compensate for imbalance, a balancing device (30) is provided which has at least two weight bodies (20, 21) movable in opposite circumferential directions within the tool body (2) in essentially the same plane. In certain embodiments, each of the two weight bodies (20, 21) forms approximately one-fourth of a circular ring.

23 Claims, 1 Drawing Sheet

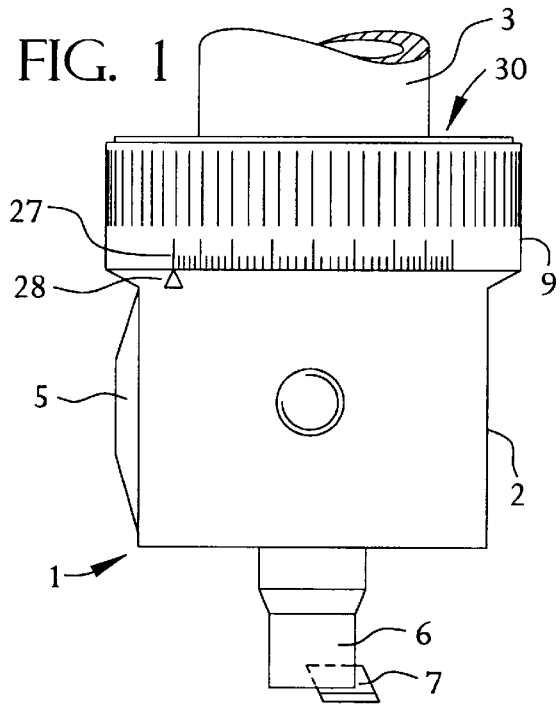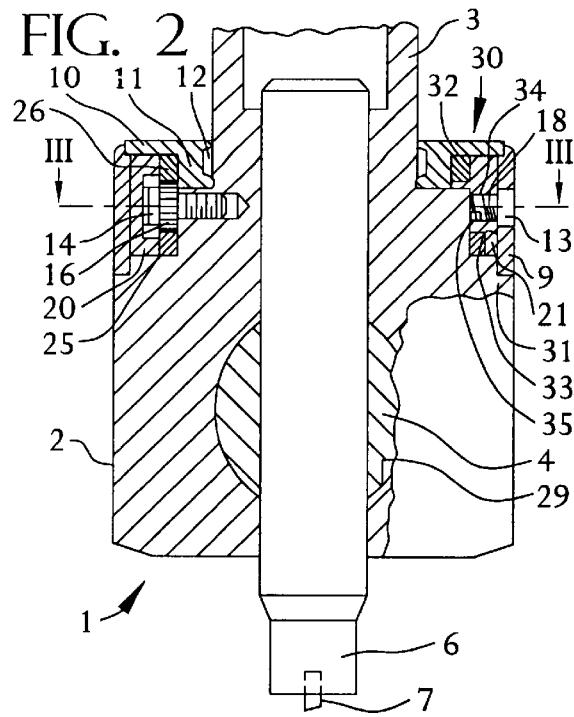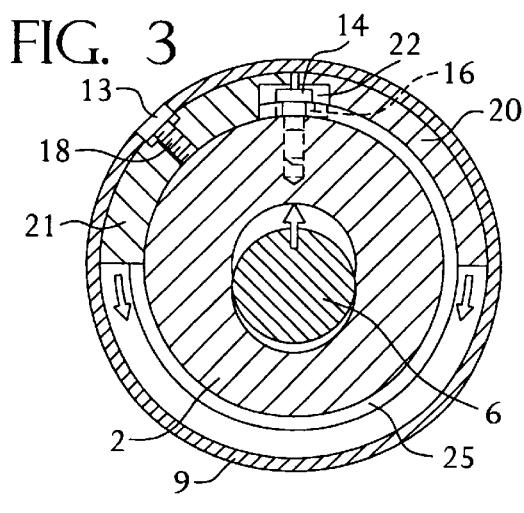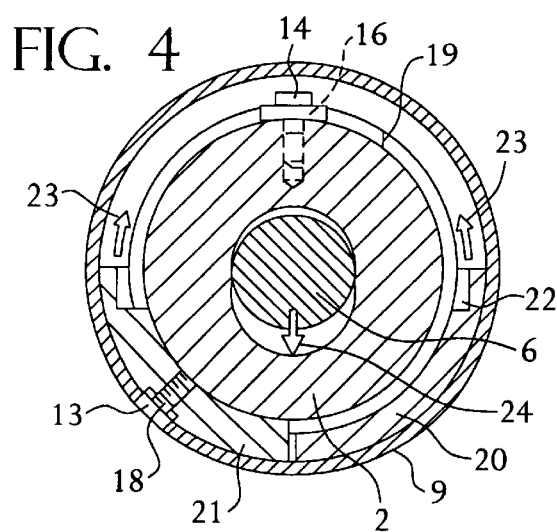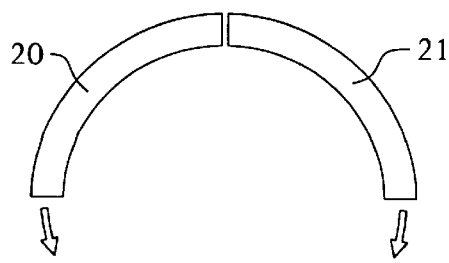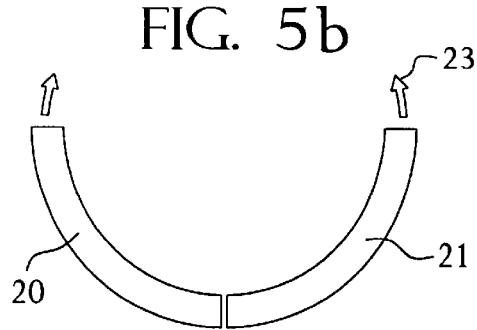

BORING HEAD WITH IMBALANCE COMPENSATION

BACKGROUND OF THE INVENTION

1. Field of the Invention

The present invention relates to boring heads for rotary tools, and, in particular, to boring heads with imbalance compensation.

2. Description of the Related Art

Boring heads are used primarily for machining close tolerance bores. Since, due to their construction, they are not rotationally symmetrical, they will be imbalanced to a greater or lesser degree. This imbalance has a negative effect on the vibrational behavior of the tool and therefore on the boring process. Such imbalance reduces the dimensional and shape precision as well as the surface quality of the bores. The development of increasingly hard and more heat-resistant cutting materials and the demand for shorter machining processes have resulted in increasingly higher rotation speeds and with it an increased need to avoid imbalance.

German patent application DE-C-35 10 259 discloses a boring head, in which imbalance compensation is provided by two weights that are installed on the circumference of the tool head, connected to a cable line, and movable in opposite directions by means of a graduated ring. The weights have the shape of semicircular disks that are capable of pivoting in opposite directions about a common pivot point by means of pull lines affixed to them leading to direction-changing bolts. This imbalance compensation device occupies a relatively large space vertically and is expensive to install and maintain. In addition, U.S. Pat. Nos. 5,074,723 and 5,263, 995 teach boring heads that have, for imbalance compensation, two weights designed as rings that move independently of one another. Here, too, the arrangement of the rings one above the other requires a relatively large space.

Finally, German patent application DE-C-42 42 063 discloses a boring tool in which a weight is automatically moved by a lever arm independently of the diametral movement. In a boring head intended to be used with bit supports of different weight, automatic imbalance compensation is unsuitable.

An objective of the present invention is to provide a boring head that makes imbalance compensation possible in a relatively simple manner and that can be produced economically. Further aspects and advantages of this invention will become apparent from the detailed description which follows.

SUMMARY OF THE INVENTION

The present invention is directed to a boring head for a rotary tool having a tool body. The boring head has a balancing device for providing imbalance compensation. The balancing device comprising at least two weight bodies adapted to move in opposite circumferential directions in essentially a single plane.

BRIEF DESCRIPTION OF THE DRAWINGS

Other aspects, features, and advantages of the present invention will become more fully apparent from the following detailed description, the appended claims, and the accompanying drawings in which:

FIG. 1 shows a side view of a boring head, according to the invention;

FIG. 2 is a longitudinal cross-section view of the boring head in FIG. 1;

FIGS. 3 and 4 show cross-section views of the boring head of FIG. 1 along line III—III of FIG. 2; and FIGS. 5a and 5b show schematically the two weight bodies of the boring head of FIG. 1 in opposite positions.

DETAILED DESCRIPTION

Embodiments of the present invention relate to a boring head (e.g., a single-edge boring head) with imbalance compensation. The boring head is part of a rotary tool having a tool body in which a tool support is mounted in a radially finely adjustable manner for a bit holder or chuck. The boring head has a balancing device that has at least two weight bodies movable in opposite circumferential directions within the tool body. Imbalance compensation is provided by the fact that the two weight bodies are capable of circumferential movement in essentially the same plane. That is, the weight bodies are not arranged one above the other, as in the prior art, but rather side-by-side on the same level within the boring head. Since, in certain embodiments, each of the weight bodies forms only one-fourth of a circle, they can be moved from one side to the other relative to the longitudinal axis of the boring head, resulting in a relatively large path of displacement of the center of gravity. In this way, a larger imbalance can be compensated using a smaller weight than is achievable with the prior art.

FIGS. 1 and 2 show a side view and a longitudinal cross-section view, respectively, of boring head 1, according one embodiment of the invention. Boring head 1 has tool body 2 on which cylindrical fixation pin 3 is arranged. Cutting-plate holder 6 with cutting plate 7 is mounted by known methods (e.g., by clamping screws not shown here) in tool support 4. Tool support 4 is inserted in cross-boring 29 of tool body 2 and is moved radially by turning graduated-scale screw 5 for adjusting the boring head diameter radially. When cutting-plate holder 6 and cutting plate 7, mounted on it, are radially displaced, the center of gravity of the boring head is shifted transversely to the longitudinal axis.

FIGS. 3 and 4 show cross-section views of boring head 1 of FIG. 1 along line III—III of FIG. 2. FIGS. 3 and 4 show the two end positions of cutting-plate holder 6. Between these positions, cutting-plate holder 6 is variably movable in the direction of arrow 24.

To compensate for imbalance in boring head 1, balancing device 30 is mounted on the shoulder of fixation pin 3. Balancing device 30 has adjustment ring 9 which is mounted rotatably on holding ring 10 and shoulder 31 of tool body 2. Weight body 21 is affixed within balancing device 30 by means of clamp screw 13.

Holding ring 10 has an inwardly projecting, threaded flange 11 and is screwed by threading 12 onto the shoulder of fixation pin 3. Holding ring 10 and adjustment ring 9 form annular channel 32 with step-shaped recess 33 within tool body 2, in which weight body 21 as well as second weight body 20 are mounted and capable of opposite circumferential motion.

FIGS. 5a and 5b show schematically the two weight bodies of the boring head of FIG. 1 in opposite end positions. As shown, weight bodies 20 and 21 are capable of infinitely variable motion in opposite circumferential directions between the two end positions.

In order for weight bodies 20 and 21 to be moved precisely in opposite circumferential directions when adjusting ring 9 is rotated, rotating cog ring 26 is affixed on the inside of weight body 20 and cog ring 25 is affixed on weight body 21. Cog rings 25 and 26 engage sprocket 16, which is rotatably mounted on tool body 2 by screw 14. The two weight bodies 20 and 21 are therefore connected to one another via end face toothing in such a way that, in the case when weight body 21 is moved by adjusting ring 9, the second weight body 20 is automatically moved in the opposite circumferential direction. The optimal setting of the two weight bodies 20 and 21 is determined, e.g., from a table that accounts for the boring diameter and the weight of cutting-plate holder 6. The value found is set on scale 27 of adjustment ring 9 relative to fixed marker 28 on tool body 2. To secure the adjusted weight bodies 20 and 21 in place, clamp screw 13 in threaded boring 31 of weight body 21 is turned in further and clamped against the outside of tool body 2.

The two weight bodies 20 and 21 preferably each form approximately one-fourth of a circular ring and may be joined to each other at the two end positions to form an approximate half-circle ring. In order for the end position shown in FIG. 3 to be possible, recesses 22 are made on rings 20 and 21 that hold sprocket 15 and the head of screw 14 in the above-mentioned position. The two end positions are therefore essentially symmetrical to one another and the path of displacement between these end positions is symmetrical to the longitudinal axis of the boring head and relatively large.

Balancing device 30 consists, as is apparent, of relatively few but robust individual parts and can be installed and maintained very simply.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A boring head for a rotary tool having a tool body, the boring head having a balancing device for providing imbalance compensation, the balancing device comprising at least two weight bodies adapted to move in opposite circumferential directions in essentially a single plane, wherein the two weight bodies engage each other via toothing for transmission of motion in opposite circumferential directions.

2. The boring head of claim 1, wherein each weight body forms approximately one-fourth of a circular ring.

3. The boring head of claim 2, wherein the rotary tool has a tool support for a cutting-plate holder, wherein the tool support is capable of precise radial movement.

4. The boring head of claim 2, further comprising means, mounted to the tool body, for transmitting opposing circumferential motion to the two weight bodies.

5. The boring head of claim 4, wherein each weight body has a toothed ring adapted to engage a sprocket rotatably mounted on the tool support for transmitting opposing circumferential motion to the two weight bodies.

6. The boring head of claim 5, wherein the two weight bodies are capable of moving between two positions at each of which they form a half circle ring.

7. The boring head of claim 6, further comprising a holding ring screwed onto an external threading of the tool body, wherein the holding ring has an internal threaded flange and forms, with an adjusting ring, a circumferential channel for mounting the weight bodies.

8. The boring head of claim 7, further comprising a clamp screw that radially engages the holding ring and one of the two weight bodies, wherein the clamp screw is adapted to be clamped in order to affix the weight bodies against an outer side of the tool body.

9. The boring head of claim 8, wherein the two weight bodies are movable between two end positions formed in mirror symmetry relative to the longitudinal axis of the boring head.

10. The boring head of claim 1, wherein each weight body has a toothed ring adapted to engage a sprocket rotatably mounted on the tool support for transmitting opposing circumferential motion to the two weight bodies.

11. The boring head of claim 10, wherein the two weight bodies are movable between two end positions formed in mirror symmetry relative to the longitudinal axis of the boring head.

12. The boring head of claim 1, further comprising means, mounted to the tool body, for transmitting opposing circumferential motion to the two weight bodies.

13. The boring head of claim 12, wherein the two weight bodies are movable between two end positions formed in mirror symmetry relative to the longitudinal axis of the boring head.

14. The boring head of claim 1, wherein the two weight bodies are capable of moving between two positions at each of which they form a half circle ring.

15. The boring head of claim 14, wherein the two weight bodies are movable between two end positions formed in mirror symmetry relative to the longitudinal axis of the boring head.

16. The boring head of claim 1, further comprising a holding ring screwed onto an external threading of the tool body, wherein the holding ring has an internal threaded flange and forms, with an adjusting ring, a circumferential channel for mounting the weight bodies.

17. The boring head of claim 16, further comprising a clamp screw that radially engages the holding ring and one of the two weight bodies, wherein the clamp screw is adapted to be clamped in order to affix the weight bodies against an outer side of the tool body.

18. The boring head of claim 1, wherein the two weight bodies are movable between two end positions formed in mirror symmetry relative to the longitudinal axis of the boring head.

19. The boring head of claim 1, wherein:
   the rotary tool has a tool support for a cutting-plate holder, wherein the tool support is capable of precise radial movement;
   each weight body forms approximately one-fourth of a circular ring;
   each weight body has a toothed ring adapted to engage a sprocket rotatably mounted on the tool support for transmitting circumferential opposing motion to the two weight bodies;
   the two weight bodies are movable between two end positions formed in mirror symmetry relative to the longitudinal axis of the boring head, at each of which they form a half circle ring; and
   further comprising:
   a holding ring screwed onto an external threading of the tool body, wherein the holding ring has an internal threaded flange and forms, with an adjusting ring, a circumferential channel for mounting the weight bodies; and
   a clamp screw that radially engages the holding ring and one of the two weight bodies, wherein the clamp screw is adapted to be clamped in order to affix the weight bodies against an outer side of the tool body.

20. A boring head for a rotary tool having a tool body, the boring head having a balancing device for providing imbalance compensation, the balancing device comprising at least two weight bodies adapted to move in opposite circumferential directions in essentially a single plane, wherein each weight body has a toothed ring adapted to engage a sprocket rotatably mounted on the tool support for transmitting opposing circumferential motion to the two weight bodies.

21. The boring head of claim 20, wherein the two weight bodies are movable between two end positions formed in mirror symmetry relative to the longitudinal axis of the boring head.

22. A boring head for a rotary tool having a tool body, the boring head having a balancing device for providing imbalance compensation, the balancing device comprising at least two weight bodies adapted to move in opposite circumferential directions in essentially a single plane, the boring head further comprising a holding ring screwed onto an external threading of the tool body, wherein the holding ring has an internal threaded flange and forms, with an adjusting ring, a circumferential channel for mounting the weight bodies.

23. The boring head of claim 22, further comprising a clamp screw that radially engages the holding ring and one of the two weight bodies, wherein the clamp screw is adapted to be clamped in order to affix the weight bodies against an outer side of the tool body.

* * * * *